US010183552B2

(12) United States Patent
Zulkowski et al.

(10) Patent No.: US 10,183,552 B2
(45) Date of Patent: Jan. 22, 2019

(54) VEHICLE TEMPERATURE AND AIR QUALITY MONITOR

(71) Applicants: Terry L. Zulkowski, Rosenberg, TX (US); John F. Font, Needville, TX (US)

(72) Inventors: Terry L. Zulkowski, Rosenberg, TX (US); John F. Font, Needville, TX (US)

(*) Notice: Subject to any disclaimer, the term of this patent is extended or adjusted under 35 U.S.C. 154(b) by 155 days.

(21) Appl. No.: 15/383,429

(22) Filed: Dec. 19, 2016

(65) Prior Publication Data
US 2017/0174156 A1 Jun. 22, 2017

Related U.S. Application Data

(60) Provisional application No. 62/268,842, filed on Dec. 17, 2015.

(51) Int. Cl.
B60H 1/00 (2006.01)
B60H 3/00 (2006.01)
(Continued)

(52) U.S. Cl.
CPC ......... B60H 1/00978 (2013.01); B60H 3/00 (2013.01); G07C 5/0808 (2013.01);
(Continued)

(58) Field of Classification Search
CPC ..... G01C 21/26; F02N 11/08; F02N 11/0807; H04L 67/12; H04L 29/08; B60C 11/24; B60C 19/00; B60C 23/0449; B60C 11/246; E05F 15/77; B60R 16/037; B60R 21/20; B60R 21/213; B60R 21/232; B60R 21/233; B60R 21/235; B60R 21/30; B60N 2/0232; B60N 2/0276; B60N 2/2863; G02B 27/01; G06K 7/10178; G06K 9/2018; G06K 9/6269; G06K 9/00838; G06K 9/00832; G06K 9/66; G07C 5/008; G07C 5/0808; G07C 5/0841; B60H 1/00207;
(Continued)

(56) References Cited

U.S. PATENT DOCUMENTS

2007/0131408 A1* 6/2007 Zeigler .............. B60H 1/00378
165/240
2010/0236770 A1* 9/2010 Pursifull ............ B60H 1/00764
165/202

(Continued)

Primary Examiner — Behrang Badii
(74) Attorney, Agent, or Firm — Raymond R. Ferrera; Adams and Reese LLP

(57) ABSTRACT

A vehicle temperature and air quality monitoring system is provided, the system including at least a system interface portion and a user interface portion. The system interface portion includes at least an electronic means for interfacing a vehicle temperature and air quality monitor and a computerized vehicle control system using a plug-in type interfacing means. In further embodiments the electronic means includes a dongle-type plug-in interfacing means such as a sixteen-pin OBD2 dongle port plug. The user interface portion further includes one or more of a cell phone port for remote adaptive programming; an external thermometer reader; a $CO_2$ intake monitor reader; and an adaptor port for facilitating connection of additional monitors.

14 Claims, 2 Drawing Sheets

(51) Int. Cl.
*G07C 5/08* (2006.01)
*F25B 27/00* (2006.01)
*B62D 65/14* (2006.01)
*B60H 1/32* (2006.01)
*F25B 29/00* (2006.01)

(52) U.S. Cl.
CPC .............. *G07C 5/0841* (2013.01); *B60H 1/00* (2013.01); *B60H 1/00207* (2013.01); *B60H 1/00378* (2013.01); *B60H 1/00428* (2013.01); *B60H 1/00764* (2013.01); *B60H 1/32* (2013.01); *B60H 1/3208* (2013.01); *B62D 65/14* (2013.01); *F25B 27/00* (2013.01); *F25B 29/00* (2013.01)

(58) Field of Classification Search
CPC .. B60H 1/00378; B60H 1/00764; B60H 1/00; B60H 1/00978; B60H 1/3208; B60H 1/322; B60H 1/3226; B60H 1/3229; B60H 3/00; B60H 1/00428; B60H 1/00778; B60H 1/3222; B60H 1/323; F25B 27/00; F25B 29/00; B62D 65/14
See application file for complete search history.

(56) References Cited

U.S. PATENT DOCUMENTS

| | | | |
|---|---|---|---|
| 2012/0296567 A1* | 11/2012 | Breed | G01C 21/26 701/468 |
| 2013/0201316 A1* | 8/2013 | Binder | H04L 67/12 348/77 |
| 2014/0032130 A1* | 1/2014 | Berkobin | G06F 19/70 702/24 |
| 2016/0311288 A1* | 10/2016 | Mayo Mayo | B60H 1/00207 |

* cited by examiner

VEHICLE TEMPERATURE AND AIR QUALITY MONITOR

FIELD

The present invention relates generally to the field of vehicle safety devices, and in a particular though non-limiting embodiment to a combined temperature and air quality monitor for use in vehicles and other enclosures in which temperatures and air quality should be monitored for safety purposes.

BACKGROUND

A public health risk exists especially with respect to children and animals trapped in vehicles and other enclosures in which overheating and even death can occur as a result of internal temperatures quickly climbing beyond damaging or lethal levels, as well as fouled air containing high levels of $CO_2$ or other dangerous gasses harmful to occupants trapped within the enclosures.

For example, studies have shown that an enclosed automobile passenger compartment can reach temperatures of 113° F. in only six minutes when exterior temperatures are 95° F.

Children or pets left can be left in a vehicle by a parent or owner, or can become trapped in a parked vehicle while playing (or if a parent or owner has gone shopping or otherwise leaves the vehicle for a short period of time), and sustain serious heat-related injuries or even death after only 15 minutes in a vehicle where temperatures have reach 107° F.

Other studies have shown that a single individual can exhale 2,000 PPM of $CO_2$ in approximately six minutes. Such $CO_2$ saturation levels are considered poor air quality, and can cause drowsiness, brain injury, or even death.

There is, therefore, a long felt but unmet need for a vehicle temperature and air quality monitoring system that safely and reliably monitors interior cabin temperatures and air quality levels, which can alert a user of the system to a detected alert condition so that the user can return to the vehicle and act to relieve the detected alert condition. Optimally, such a system would also facilitate direct vehicle action to relieve the alert condition even in the absence of a human actor.

SUMMARY

A vehicle temperature and air quality monitoring system is provided, the system including at least a system interface portion and a user interface portion. In one embodiment the system interface portion further comprises an electronic means for interfacing a vehicle temperature and air quality monitor and a computerized vehicle control system. In another embodiment the electronic means is a plug-in type interfacing means. In a further embodiment the electronic means further comprises a dongle-type plug-in interfacing means. In a still further embodiment the dongle-type interfacing means further comprises a sixteen-pin OBD2 dongle port plug.

Also disclosed is a vehicle temperature and air quality monitoring system further including at least a user interface portion which further comprises a cell phone port for remote adaptive programming. In one embodiment the user interface portion further comprises an external thermometer reader. In another embodiment the user interface portion further comprises a $CO_2$ intake monitor reader. In a further embodiment the user interface portion further comprises an adaptor port for facilitating connection of additional monitors. In a still further embodiment the user interface portion further comprises one or more of a cell phone port for remote adaptive programming; an external thermometer reader; a $CO_2$ intake monitor reader; and an adaptor port for facilitating connection of additional monitors.

DETAILED DESCRIPTION

Figure 1:
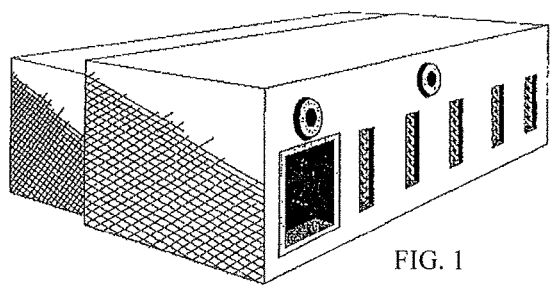
FIG. 1 is a front view of an example vehicle temperature and air quality monitor according to the present invention.

According to one example embodiment, a combined vehicle temperature and air quality monitor is provided which monitors both interior cabin temperatures and air quality characteristics such as $CO_2$ saturation.

In another embodiment, when the monitor is disposed in electronic communication with the vehicle by an appropriate vehicle communication means, e.g., by means of a dongle or other plug-in connector as is known in the art, or else by future-developed means suitable for such interfacing and communication, the monitor becomes connected to the vehicle's computerized control system.

For example, many modern vehicles are equipped with an onboard diagnostics system such as the standardized OBD2 system, which can access the vehicle's Controller Area Network (CAN-BUS). In this manner, vehicle manufacturers have been able to greatly reduce the number of wires run between various electronic devices in a vehicle and the vehicle's battery. The CAN system frequently works in coordination with a Totally Integrated Power Module (TIPM) to control solenoids and relays; to lock and unlock doors; and to control miniaturized motors used to roll windows up and down.

In another example embodiment, the monitoring system is programmed with an algorithm that interacts with the vehicle's computerized control systems to control one or more electro-mechanical control nodes (e.g., a switch pod that can control operation of the windows, or which locks and unlocks associated electric door locks, etc.).

In a further embodiment, the system broadcast an alert signal across the CAN-BUS when a predefined alert condition is detected. In a still further embodiment, when the TIPM detects a valid alert signal it initiates one or more predefined alert relief actions, for example, unlocking doors, rolling down windows, etc. In one example embodiment, the system also sends a text message, email or other predefined alert condition delivery signal alerting the owner or driver of the vehicle of the detected alert condition.

When equipped with additional ports or other data signal transmission and receiving means, additional monitors can be added to the system as may be appropriate for larger vehicles. The system could also be provided as a part of standard vehicle system safety package in new vehicles. Such original equipment systems may not need to be plugged into an OBD2 port, but could still deliver the functionality for additional monitors, programming for text messages, key chain alert alarms, etc.

According to one example embodiment, the system is set in an inactive mode while the vehicle is running or the ignition is in the on position; in others, the system is fully functional while the vehicle is in operation. In the former case, the device activates when the vehicle ignition system has been turned off.

In some embodiments, only when the preset limits of both $CO_2$ and interior temperatures are met or exceeded will an alert relief response signal activate the system by, for example, rolling down the windows in the vehicle and alerting a user by text message or the like. In other embodiments, detection of either deleterious condition will activate the response system even in an absence of the other.

In one embodiment, the system is programmed with a default setting to activate and roll down windows when one of a plurality of alert conditions is detected. For example, the system can be programmed to react to a detected condition of 2,000 PPM of $CO_2$ in the ambient air supply.

In other embodiments the system is present to a higher tolerance, e.g., to react only when $CO_2$ levels exceed 5,000 PPM even when the vehicle is running, as such levels of $CO_2$ saturation in a vehicle can cause serious oxygen deprivation, thereby resulting in permanent brain damage, coma, or even death.

Similar preset temperature increases will also provoke a responsive alert reaction; for example, when temperatures reach 90° F. or 100° F., etc.

With reference now to the attached drawings, FIG. 1 is a front view of an example vehicle temperature and air quality monitor according to the present invention. A plurality of ports and other communication means are equipped to facilitate interaction across multiple communication and control platforms.

Figure 2:
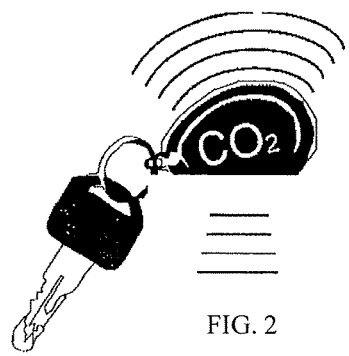
FIG. 2 is a representative illustration of an alert device useful for alerting a user when a predefined alert state has been detected.

FIG. 2 is a representative illustration of an alert device useful for alerting a user when an emergency state is detected. In practice, when a predefined alert condition is detected, an alert response signal is sent to an associated user to alert the user to the detected condition.

Figure 3:
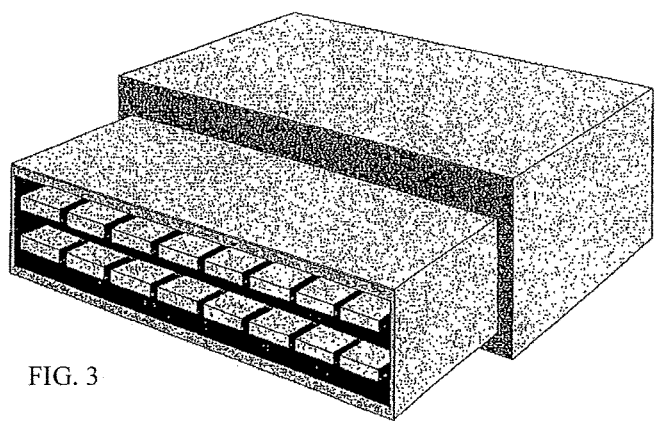
FIG. 3 is a port view of an example vehicle temperature and air quality monitor according to the present invention.

FIG. 3 is a port view of a further example vehicle temperature and air quality monitor according to the present invention. This view demonstrates appropriate connection means using current technologies as will readily occur to an ordinarily skilled artisan.

Figure 4:
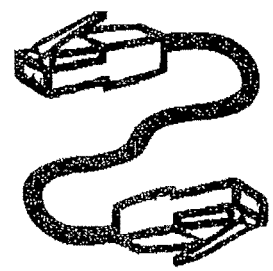
FIG. 4 is an illustrative representation of a communication means suitable for facilitating data transmission and receiving.

FIG. 4 is an illustrative representation of a communication means suitable for facilitating data transmission and reception between the monitoring system and the vehicle's computerized control systems. As with the device's other subroutines and subsystems, a great many such means, either currently known of future-developed, will be suitable for practicing the invention in accord with the instant disclosure.

Figure 5:
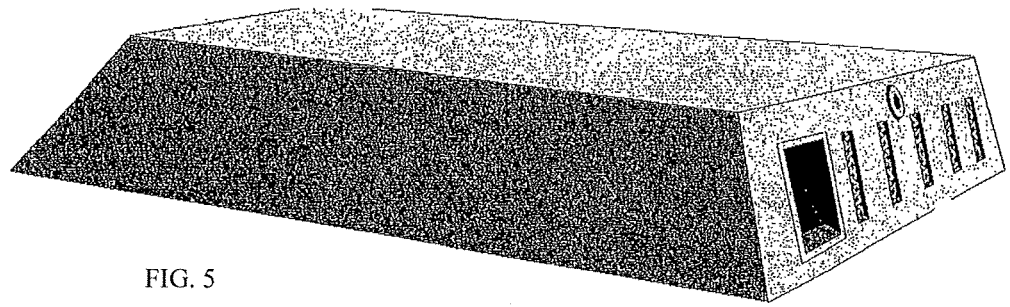
FIG. 5 is an in-line view of an example vehicle temperature and air quality monitor according to the present invention.

FIG. 5 is an in-line view of an example vehicle temperature and air quality monitor according to the present invention in which a side view of the monitor's body portion between the front view depicted in FIG. 1 and the port view depicted in FIG. 3 is illustrated.

Figure 6:
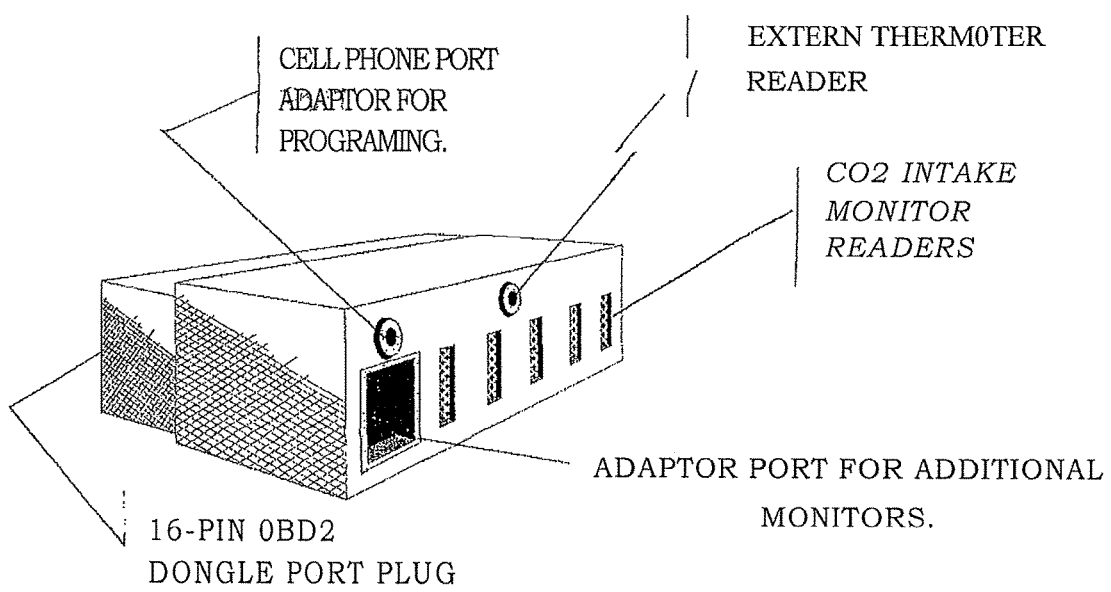
FIG. 6 is a front view of an example vehicle temperature and air quality monitor according to the present invention in which various example features of the monitor are isolated and identified.

FIG. 6 is a front view of an example vehicle temperature and air quality monitor according to the present invention in which various example features of the monitor are isolated and identified. For example, the system may include one or more of the following features (or combinations thereof), such as a cell phone port adaptor for accepting remote programming; an external thermometer reader; a $CO_2$ intake monitor reader; an adaptor port for additional monitors, and an OBD2 dongle-type port plug. Various other detection, communication and alert means, whether singular or plural, will naturally occur to one of ordinary skill in the art and serve with equal efficacy across multiple performance platforms and requirement packages.

The foregoing specification is provided for illustrative purposes only, and is not intended to describe all possible aspects of the present invention. Moreover, while the invention has been shown and described in detail with respect to several exemplary embodiments, those of ordinary skill in the relevant arts will readily appreciate that minor changes to the description, and various other modifications, omissions and additions may also be made without departing from either the spirit or scope thereof.

The invention claimed is:

1. A vehicle interior cabin environmental monitoring system, said system comprising:
   a temperature and air quality monitoring portion including:
      a system interface portion configured to interface with the an electronic control system of the vehicle; and
      a temperature and air quality monitoring control portion configured to interface with an electronic control system of the vehicle; and
   a user interface portion configured to receive temperature and air quality information collected from the interior cabin of the vehicle and communicate said information to at least one user,
   wherein the temperature and air quality monitoring control portion is configured to send at least one signal to the electronic control system of the vehicle upon detection of an elevated temperature or an abnormal air quality level; and
   wherein the interior cabin monitoring system is further configured to be inactive when the vehicle is running and active with the vehicle is not running.

2. The system of claim 1, wherein said system interface portion further comprises an electronic means for interfacing a vehicle temperature and air quality monitor and a computerized vehicle control system.

3. The system of claim 2, wherein said electronic means is a plug-in type interfacing means.

4. The system of claim 3, wherein said electronic means further comprises a dongle-type plug-in interfacing means.

5. The system of claim 4, wherein said dongle-type interfacing means further comprises a sixteen-pin OBD2 dongle port plug.

6. The system of claim 1, wherein said user interface portion further comprises a cell phone port for remote adaptive programming.

7. The system of claim 1, wherein said user interface portion further comprises an external thermometer reader.

8. The system of claim 1, wherein said user interface portion further comprises a CO2 intake monitor reader.

9. The system of claim 1, wherein said user interface portion further comprises an adaptor port for facilitating connection of additional monitors.

10. The system of claim 1, wherein said user interface portion further comprises one or more of a cell phone port for remote adaptive programming; an external thermometer reader; a CO2 intake monitor reader; and an adaptor port for facilitating connection of additional monitors.

11. The system of claim 1, wherein the at least one signal sent from the air quality monitoring control portion to the electronic control system of the vehicle instructs the electronic control system of a vehicle to lower at least one window of a vehicle.

12. The vehicle interior cabin monitoring system of claim 1, wherein the system is not part of a standard vehicle system safety package.

13. The vehicle interior cabin monitoring system of claim 1, wherein the system is integrated into a standard vehicle system safety package.

14. The vehicle interior cabin monitoring system of claim 12, wherein the system is an aftermarket addition to a standard vehicle system safety package.

\* \* \* \* \*